(12) United States Patent
Percebon et al.

(10) Patent No.: US 10,124,687 B2
(45) Date of Patent: Nov. 13, 2018

(54) HYBRID FOREIGN OBJECT DETECTION (FOD) LOOP ARRAY BOARD

(71) Applicant: QUALCOMM Incorporated, San Diego, CA (US)

(72) Inventors: Leandro Percebon, Munich (DE); Daniel Kuerschner, Grasbrunn (DE)

(73) Assignee: QUALCOMM Incorporated, San Diego, CA (US)

(*) Notice: Subject to any disclaimer, the term of this patent is extended or adjusted under 35 U.S.C. 154(b) by 43 days.

(21) Appl. No.: 15/264,908

(22) Filed: Sep. 14, 2016

(65) Prior Publication Data

US 2018/0072166 A1 Mar. 15, 2018

(51) Int. Cl.
| | |
|---|---|
| B60L 11/18 | (2006.01) |
| H02J 50/10 | (2016.01) |
| H02J 50/60 | (2016.01) |

(52) U.S. Cl.
CPC ............. B60L 11/182 (2013.01); H02J 50/10 (2016.02); H02J 50/60 (2016.02)

(58) Field of Classification Search
CPC .................................................... B60L 11/182
USPC ......................................................... 320/108
See application file for complete search history.

(56) References Cited

U.S. PATENT DOCUMENTS

| | | |
|---|---|---|
| 2013/0069441 A1 | 3/2013 | Verghese et al. |
| 2014/0111019 A1* | 4/2014 | Roy ........................ G01V 3/081 |
| | | 307/104 |
| 2014/0125140 A1 | 5/2014 | Widmer et al. |
| 2015/0028849 A1 | 1/2015 | Covic et al. |
| 2015/0260835 A1 | 9/2015 | Widmer et al. |
| 2015/0323694 A1 | 11/2015 | Roy et al. |

FOREIGN PATENT DOCUMENTS

DE  102013227129 B4  1/2016

OTHER PUBLICATIONS

International Search Report and Written Opinion—PCT/US2017/047086—ISA/EPO—Nov. 22, 2017.

* cited by examiner

*Primary Examiner* — Suresh Memula
(74) *Attorney, Agent, or Firm* — Hunter Clark PLLC

(57) ABSTRACT

Techniques for detecting a presence of a metallic and/or a ferromagnetic object over a region for wirelessly transferring power to charge an electric vehicle are presented. An example apparatus includes one or more foreign object detection (FOD) loops arranged in an array over a charging area, at least a portion of the FOD loops being in a first configuration and at least a portion of the FOD loops being second configuration different than the first configuration based on a value indicative of an amount of magnetic coupling between the charging area and a respective one the FOD loops within a corresponding area of the array.

24 Claims, 14 Drawing Sheets

HYBRID FOREIGN OBJECT DETECTION (FOD) LOOP ARRAY BOARD

FIELD

This application is generally related to wireless power charging of chargeable devices such as electric vehicles, and more specifically to systems and methods for detecting foreign metallic objects in the charging path.

BACKGROUND

Chargeable systems, such as vehicles, have been introduced that include locomotion power derived from electricity received from an energy storage device such as a battery. Vehicles that are solely electric generally receive the electricity for charging the batteries from other sources. Battery electric vehicles are often proposed to be charged through some type of wireless charging system that is capable of transferring power in free space (e.g., via a magnetic field and/or electric field). Some such systems may provide wireless power to the vehicle while the vehicle is located on the roadway, in motion or stationary. Foreign metallic objects interposed between the charging pad and the vehicle may create a safety issue since the intense magnetic fields generated by the charging pad may cause the foreign metallic object to heat up. A Foreign Object Detection (FOD) system may be used to detect metallic and/or ferromagnetic objects in the proximity of a magnetic flux density which is generated by the power transfer charging pads. A detection can be realized using FOD loop coils (loops) which are capable recognizing changes in the magnetic field distribution caused by the presence of such metallic and/or ferromagnetic objects.

SUMMARY

An example of an apparatus for detecting a presence of a metallic and/or a ferromagnetic object over a region for wirelessly transferring power to charge an electric vehicle according to the disclosure includes a plurality of foreign object detection (FOD) loops arranged in an array over a charging area, at least a portion of the plurality of FOD loops being in a first configuration and at least a portion of the plurality of FOD loops being in a second configuration different than the first configuration based on a value indicative of an amount of magnetic coupling between the charging area and a respective one the plurality of FOD loops within a corresponding area of the array.

Implementations of such an apparatus may include one or more of the following features. A difference between the first configuration and the second configuration may correspond to a difference in a magnetic flux direction of the respective portions of FOD loops. The first configuration may be a double loop in a first orientation, and the second configuration may be a double loop is a second orientation different than the first orientation. The amount of magnetic coupling may be based on an operating frequency of one or more charging coils in the charging area. The charging area may include one or more areas with a first magnetic flux direction and one or more areas with a second magnetic flux direction different from the first magnetic flux direction. At least a portion of the plurality of FOD loops may be in the first configuration are disposed over the one or more areas with the first magnetic flux direction, and the at least a portion of the plurality of FOD loops may be in the second configuration are disposed over the one or more areas with the second magnetic flux direction. The first configuration may be a circular loop and the second configuration may be a double loop wound with a figure-eight configuration. The second configuration may be a double loop orientated along an x-axis or a double loop oriented along a y-axis. The second configuration may be a double loop oriented along a diagonal axis oriented between an x-axis and a y-axis. A control circuit may be operably coupled to each of the plurality of FOD loops and may be configured to drive each of the plurality of FOD loops at a first frequency that is different from an operating frequency of one or more charging coils in the charging area to generate a magnetic field, and to detect the metallic and/or the ferromagnetic object based on an electrical characteristic in one or more of the plurality of FOD loops caused by the metallic and/or the ferromagnetic object coupling with the magnetic field. The electrical characteristic may be a voltage amplitude value and/or a phase measurement. The control circuit may be configured to reduce a charging operation based on the electrical characteristic in one or more of the plurality of FOD loops.

An example of a method of detecting foreign objects in a wireless power transfer system according to the disclosure includes determining a foreign object detection (FOD) array dimension, wherein the FOD array comprises a plurality of FOD loop elements disposed over one or more primary charging coils in the wireless power transfer system, determining one or more FOD loop configurations for each of the plurality of FOD loop elements, determining a FOD loop orientation for each of the one or more FOD loop configurations in each of the plurality of FOD loop elements, and selecting a FOD loop configurations and the FOD loop orientation for each of the plurality of FOD loop elements based on a minimum magnetic coupling to the one or more primary charging coils.

Implementations of such a method may include one or more of the following features. The one or more FOD loop configurations may include a circular loop and a double loop. The FOD loop orientation for the double loop may be along an x-axis or a y-axis respective to the one or more primary charging coils.

An example of an apparatus for wirelessly transferring power to charge an electric vehicle according to the disclosure includes a primary charging coil in a double-D (DD) configuration configured to operate at a first frequency, a plurality of foreign object detection (FOD) loops arranged in an array over the primary charging coil, at least a portion of the plurality of FOD loops being in a first configuration and at least a portion of the plurality of FOD loops being a second configuration that is different than the first configuration, and a control circuit operably coupled to the primary charging coil and the plurality of FOD loops, and configured to drive the plurality of FOD loops at a second frequency that is different from the first frequency to generate a magnetic field, and to detect a foreign object based on an electrical characteristic in at least one of the plurality of FOD loops caused by the foreign object coupling with the magnetic field.

Implementations of such an apparatus may include one or more of the following features. A difference between the first configuration and the second configuration may correspond to a magnetic flux direction of the respective at least a portion of the plurality of FOD loops. The first configuration may be a circular loop and the second configuration may be a double loop wound in a figure-eight configuration. The first configuration may be a double loop in a first orientation, and the second configuration may be a double loop is a second orientation different than the first orientation. The primary charging coil may include one or more areas with a first magnetic flux direction and one or more areas with a second magnetic flux direction different from the first magnetic flux direction. At least a portion of the plurality of FOD loops in the first configuration may be disposed over the one or more areas with the first magnetic flux direction, and the at least a portion of the plurality of FOD loops in the second configuration may be disposed over the one or more areas with the second magnetic flux direction. The second configuration may be a double loop oriented along a diagonal axis oriented between an x-axis and a y-axis. The electrical characteristic may be a voltage amplitude value and/or a phase measurement. The control circuit may be configured to reduce a transfer of power to the electric vehicle based on the electrical characteristic in one or more of the plurality of FOD loops. The first frequency may be in a range from 80-90 kHz. The second frequency maybe in a range from 1-10 MHz.

An example of an apparatus for wirelessly transferring power to charge an electric vehicle according to the disclosure includes a primary charging means for providing power to the electric vehicle at a first frequency, detection means for detecting foreign objects, the detection means arranged in an array over a primary charging means, at least a portion of the detection means being in a first configuration and at least a portion of the detection means being a second configuration that is different than the first configuration, and a control means operably coupled to the detection means and configured to drive the detection means at a second frequency that is different from the first frequency to generate a magnetic field, and to detect a foreign object based on an electrical characteristic in the detection means caused by the foreign object coupling with the magnetic field. The control means may be operably coupled to the primary charging means and configured to reduce a transfer of power to the electric vehicle based on the electrical characteristic in the detection means.

Items and/or techniques described herein may provide one or more of the following capabilities, as well as other capabilities not mentioned. A foreign object detection (FOD) loop array may be installed over a wireless power transfer charging base pad. The FOD loop array may comprise more than one element, with each element containing a FOD loop. The FOD loops may be of different configurations such as a circular loop or a double loop (e.g., a double-D (DD) loop). The FOD loops may be in different orientations. The different configurations and orientations may have different magnetic flux directions. The selection of the FOD loop configuration and orientation is based on a minimum magnetic coupling to one or more power transfer coils. The FOD loop configurations and orientations may vary element to element with the FOD loop array. The impact of harmonic signals generated by the base pad can be reduced and the signal-to-noise ratio within the FOD loops may be increased. A control circuit may detect changes in the electrical characteristics in the FOD loops. Metallic objects may be detected based on the changes in the electrical characteristics. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a magnetic field and/or electric field may be received, captured by, or coupled by a "receiving coil" to achieve power transfer. Foreign metal objects disposed within the magnetic field and/or electric field may degrade the power transfer and/or create safety issues do to heat generated within the foreign object. Foreign Object Detection (FOD) loops may be disposed in a magnetic field and/or electric field to detect changes in electrical characteristics caused by the foreign object. The electrical characteristics may be changes in electrical signal characteristics such as an induced voltage amplitude value or a phase measurement of current flowing in the FOD loops. The sensitivity of the FOD loops may be reduced due to the presence of harmonic frequencies associated with the power output to the magnetic field and/or electric field from the transmitter.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
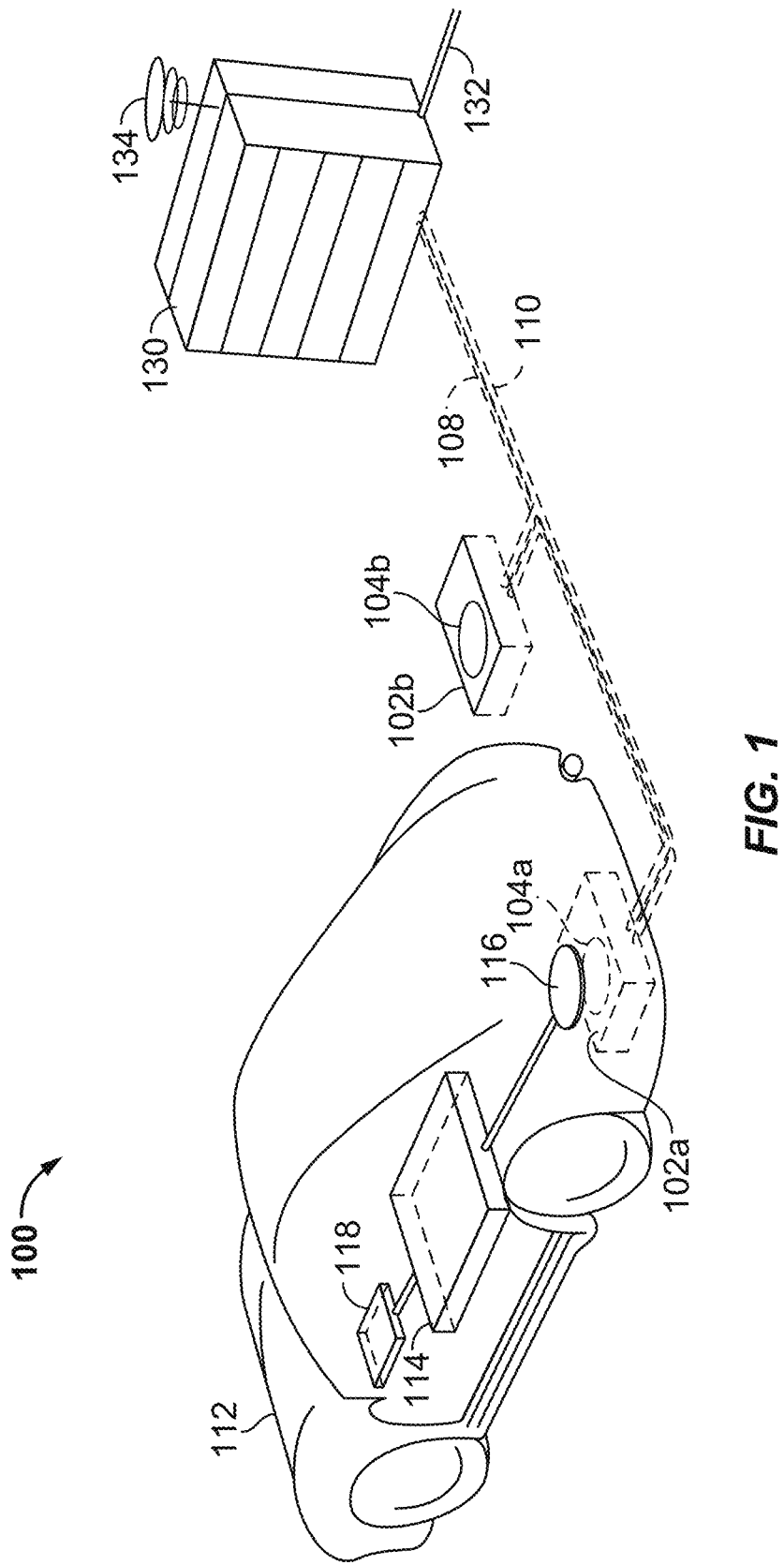
FIG. 1 is a diagram of an exemplary wireless power transfer system for charging an electric vehicle.

Referring to FIG. 1, a diagram of an exemplary wireless power transfer system 100 for charging an electric vehicle 112 is shown. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a. While a static charging configuration is depicted in FIG. 1, the hybrid foreign object detection loops described herein may also be implemented in dynamic charging configurations such as with a base array network (BAN).

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below. Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians. A potential safety issue, however, may arise when metallic foreign objects are located in the near-field generated by the base system induction coil 104a or the vehicle induction coil 116 (e.g., in a V2G configuration). The magnetic energy in the near-field may be transformed into thermal energy within a metallic foreign object, thus creating a fire hazard.

Figure 2:
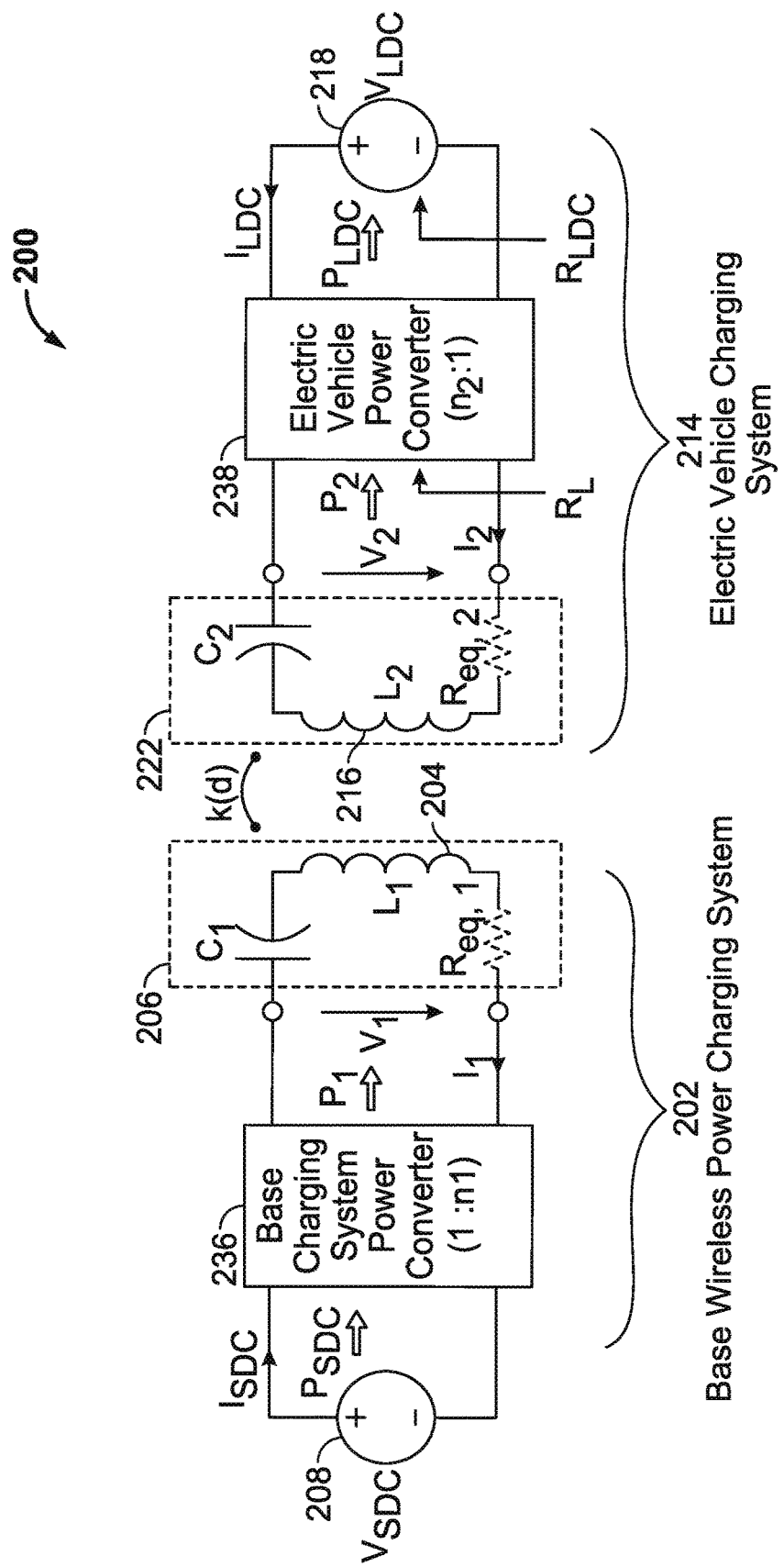
FIG. 2 is a schematic diagram of exemplary core components of the wireless power transfer system of FIG. 1.

Referring to FIG. 2, a schematic diagram of exemplary core components of the wireless power transfer system 100 of FIG. 1 is shown. The wireless power transfer system 200 may include a base system transmit circuit 206 including a base system induction coil 204 having an inductance L1. The wireless power transfer system 200 further includes an electric vehicle receive circuit 222 including an electric vehicle induction coil 216 having an inductance L¬2. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

A power supply 208 (e.g., AC or DC) supplies power PSDC to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power P1 to the base system transmit circuit 206 including the capacitor C1 in series with the base system induction coil 204 to emit an electromagnetic field at a desired frequency. The capacitor C1 may be provided to form a resonant circuit with the base system induction coil 204 that resonates at a desired frequency. The base system induction coil 204 receives the power P1 and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor C2 and electric vehicle induction coil 116. The capacitor C2 may be provided to form a resonant circuit with the electric vehicle induction coil 216 that resonates at a desired frequency. Element k(d) represents the mutual coupling coefficient resulting at coil separation. Equivalent resistances Req,1 and Req,2 represent the losses that may be inherent to the induction coils 204 and 216 and the anti-reactance capacitors C1 and C2. The electric vehicle receive circuit 222 including the electric vehicle induction coil 316 and capacitor C2 receives power P2 and provides the power P2 to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power PLDC to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle wireless charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle wireless charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling. The coils may be litz wire.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. Inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high native quality (Q) factor to lower the losses of the induction coil and to increase efficiency of the inductive coupling system.

Figure 3:
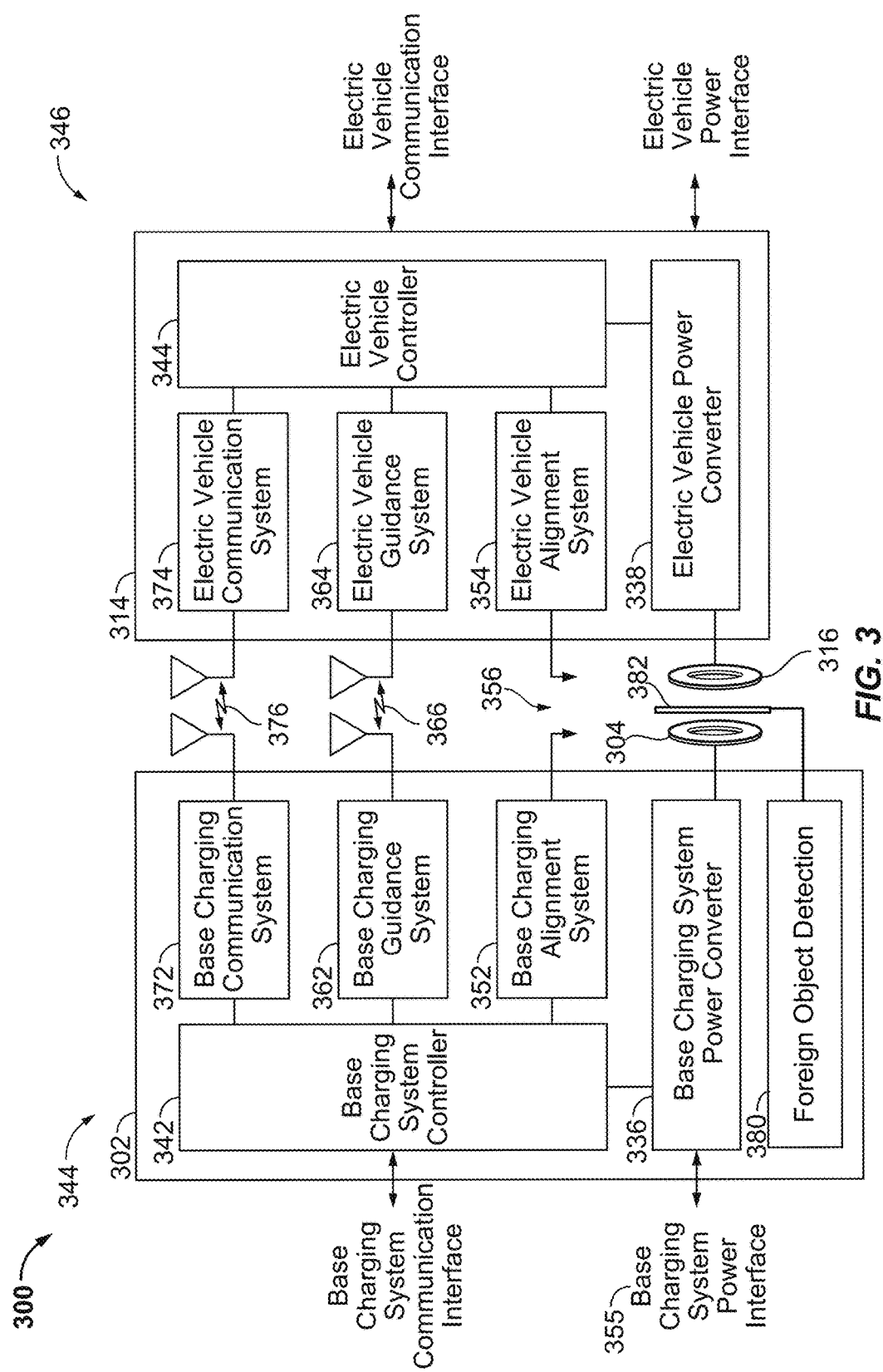
FIG. 3 is another functional block diagram showing exemplary core and ancillary components of the wireless power transfer system of FIG. 1.

Referring to FIG. 3, another functional block diagram showing exemplary core and ancillary components of the wireless power transfer system 300 of FIG. 1 is shown. The wireless power transfer system 300 illustrates a foreign object detection module 380, a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 355 may be configured to provide power to a charging system power converter 336 from a power source, such as an AC or DC power supply. The base charging system power converter 336 may receive AC or DC power from the base charging system power interface 355 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. The base charging system controller 342 may be operably coupled to a foreign object detection module 380 and one or more hybrid foreign object detection loop arrays 382. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, foreign object detection information, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle wireless charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of foreign metal objects near the base system induction coil 304 (e.g., via the hybrid FOD loop arrays 382) that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at an operating frequency in the range from 10-150 kHz and particularly in the range from 80-90 kHz. This low frequency coupling may allow highly efficient power conversion that may be achieved using solid state devices. In addition, there may be less coexistence issues with radio systems compared to other bands.

Figure 4:
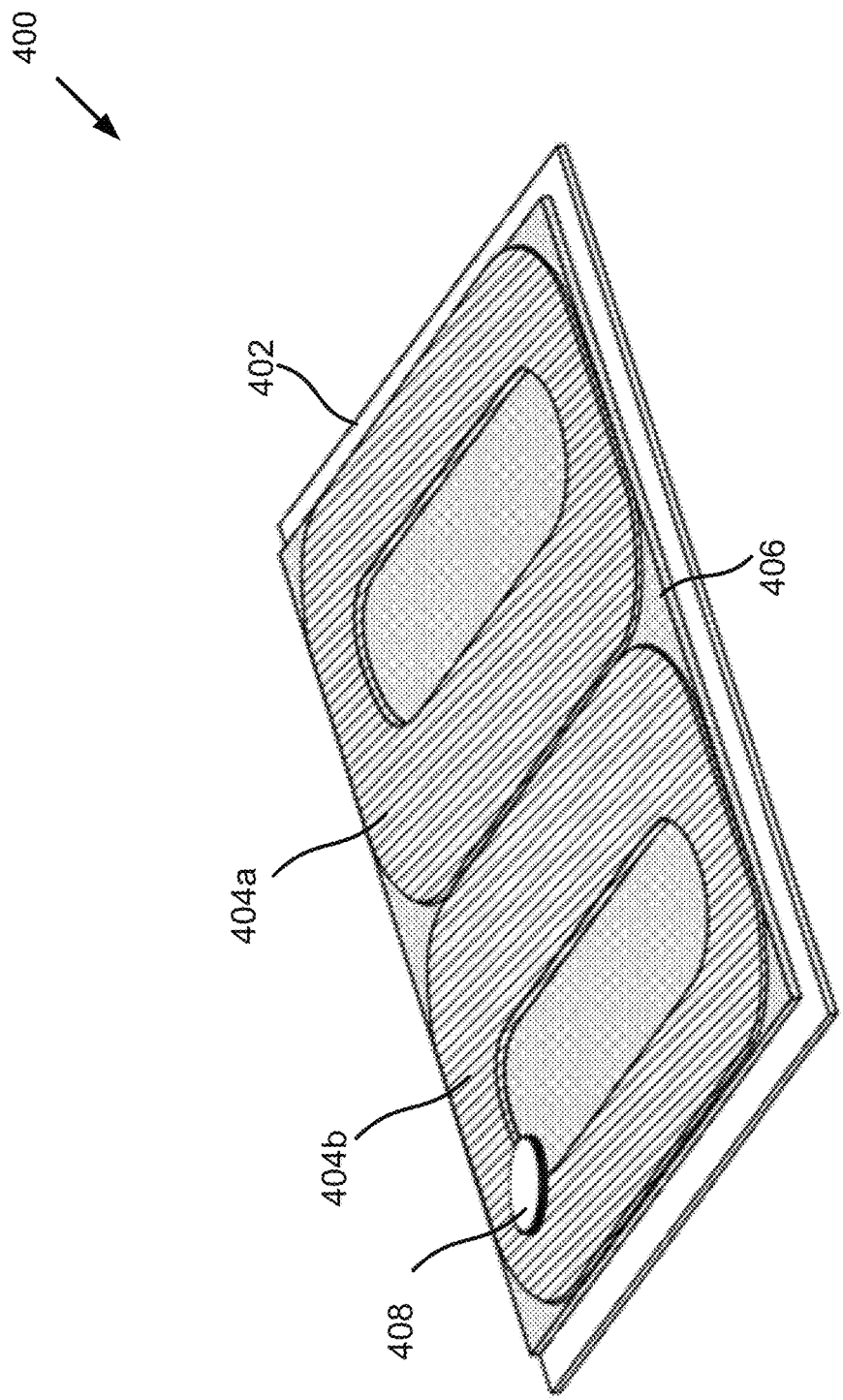
FIG. 4 is a perspective illustration of a magnetic flux device with a foreign object.

Referring to FIG. 4, with further reference to FIG. 3, a perspective illustration 400 of a magnetic flux device 402 with a foreign object 408 is shown. As an example, the magnetic flux device 402 is configured as a double loop, full-size coil with a ferrite layer configured to transmit or receive magnetic flux to or from a space beyond the magnetic flux device. The double loop (e.g., double-D) configuration is exemplary only and not a limitation as other configurations such as circular, bi-polar, and solenoid type couplers may be used. As used herein, the term "magnetic flux device" has its broadest reasonable interpretation, including but not limited to, a base pad, a vehicle pad, or other type of magnetic flux pad, and is not restricted to any particular shape, dimensions, or combination of components. As used herein, the term "pad" has its broadest reasonable interpretation, including but not limited to, a device (e.g., a base pad, a vehicle pad) configured for use in a wireless electric vehicle charging system, and is not restricted to any particular shape, dimensions, or combination of components. For example, the hybrid FOD loop array board may be used with circular power transfer based and vehicle pad topologies. The magnetic flux device 402 comprises at least a first electrically conductive coil 404a and a second electrically conductive coil 404b. The first coil 404a is substantially planar and has a first periphery bounding a first area. The second coil 404b is substantially planar and has a second periphery bounding a second area. The second coil 404b is substantially coplanar with the first coil 404a. The magnetic flux device 402 further comprises a magnetically permeable material 406 having a substantially planar surface and having a third periphery bounding a third area. The magnetically permeable material 406 is sometimes referred to herein as a "core." As used herein, the term "core" has its broadest reasonable interpretation, which in particular, is not to limited to being in a central location or being wrapped around by other components. The magnetically permeable material 406 can be magnetically associated with at least the first coil 404a and the second coil 404b. The first coil 404a and the second coil 404b are substantially parallel to the substantially planar surface. A ratio of a sum of the first area and the second area to the third area is in a range between 0.9 and 1.1. The magnetic flux device 402 may be enclosed in an insulating shell (not shown) to provide electrical isolation and protection from the environment. A foreign object 408 is located within the area of magnetic flux transmitted by the magnetic flux device 402. The foreign object 408 represents any metallic object such as coins, nuts, bolts, washers, beverage cans, or any other metallic object that may be found in proximity to the magnetic flux device 402 and creating a potential safety hazard due to heating caused by eddy current induction or magnetic hysteresis loss.

Figure 5:
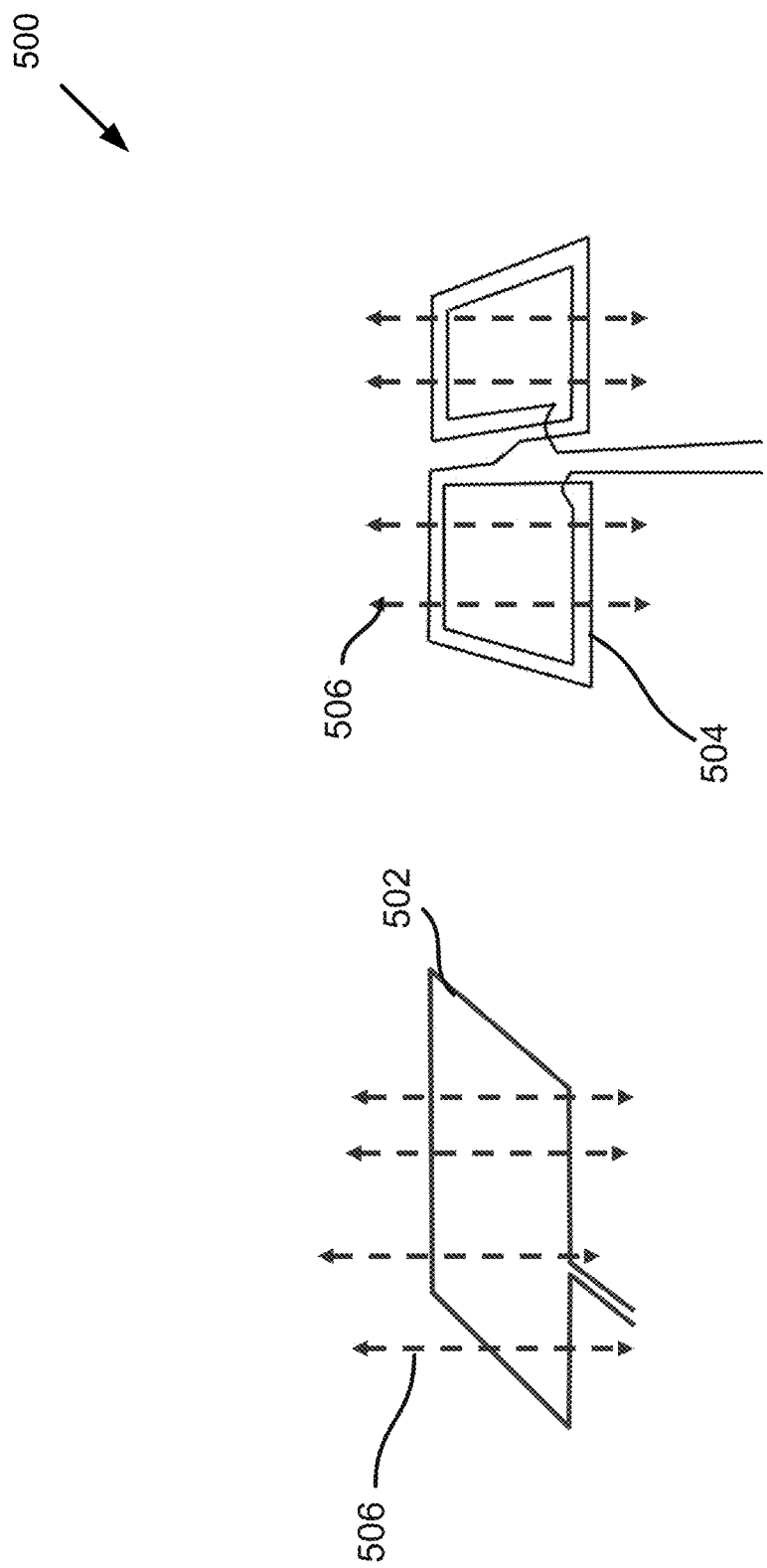
FIG. 5 is an illustration of two example FOD loop configurations with the main flux direction of DD type coils.

Referring to FIG. 5, an illustration 500 including two example FOD loop configurations is shown. The example FOD loop configurations include a circular loop 502 and a double (e.g. double-D (DD)) loop 504. The circular loop 502 and the double loop 504 may be separate elements within a FOD loop array. The magnetic flux is represented by the flux lines 506 passing through the respective FOD loops 502, 504. For example, the magnetic flux may be harmonic content from a pulsating magnetic field generated in a magnetic flux device. In general, the orientation and configuration of the circular loop 502 allows for generating/detecting magnetic flux 506 passing vertically through the loop. The circular loop 502 is sensitive to magnetic flux with vertical orientation (i.e., the circular loop 502 has a vertical magnetic flux direction). The orientation and configuration of the double loop 504 allows for generating/detecting magnetic flux 506 passing through the loops, but since each "D" loop has an opposing winding direction, in theory the induced voltage in a homogenous field is zero. The interior conductors in a double loop (i.e., the sides of the loops that are adjacent to one another) are configured such that the current in each loop is flowing in the same direction relative to one another. This configuration of current flow means that the double loop 504 is sensitive to magnetic flux with a horizontal orientation (i.e., the double loop 504 has a horizontal magnetic flux direction).

A hybrid FOD loop array may include a plurality of elements containing a FOD loop such as the circular loop 502 or the double loop 504. Each of the FOD loops in the hybrid FOD loop array may be operably connected to a control circuit configured to detect changes in the electrical characteristics of the FOD loops. In an example, the control circuit analyzes signals in the FOD loops with frequencies in the MHz range. The signal analysis, however, may be impeded by the presence of harmonic signals generated by the primary charging coils (e.g., a magnetic flux device 402). Typical charging frequencies present in the primary charging coils are in the range of 80-90 kHz but the associated harmonic signals may extend into the MHz range. These harmonics may generate noise in the FOD loops signals and create challenges to filter out this undesired noise. Noise generated based on the field generated by the primary charging coils may cause changes in electrical characteristics in the FOD loops that might result in false positives or mask changes that are caused by actual objects that the system is trying to detect. The selection of the FOD loop configuration and orientation (e.g., in the X-Y plane) for each element in a hybrid FOD loop array may reduce the impact of the harmonic noise and improve the signal-to-noise ratio (SNR) on the respective FOD loops. For example, it is desirable to reduce the integral value of the z-component of the magnetic field ($H\_z$) which is caused by the power transfer pads coils in every FOD loop. This can be done by a proper design and selection of the loop coils (e.g. design, configuration, orientation).

Figure 6:
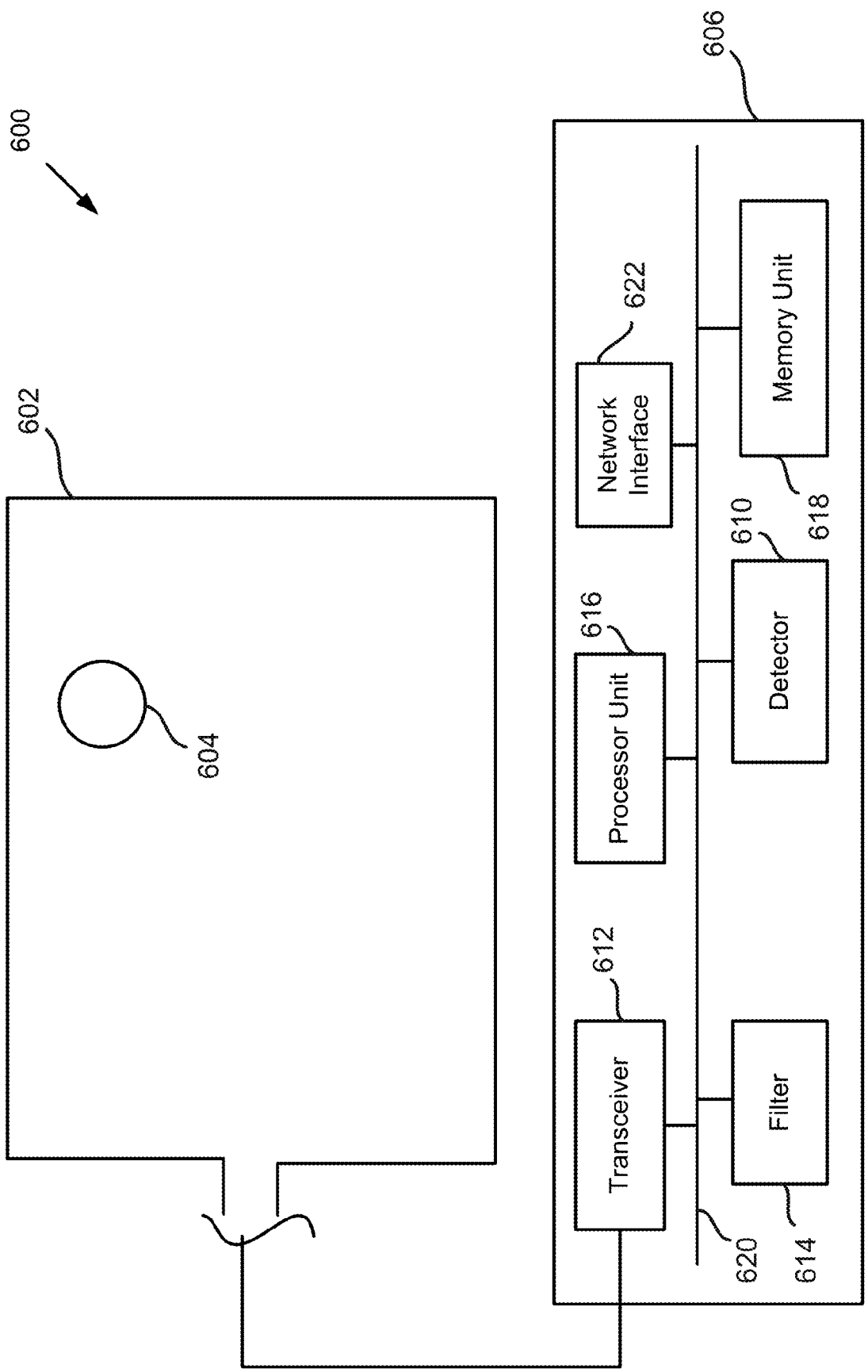
FIG. 6 is a functional block diagram of a FOD system with a circular loop.

Referring to FIG. 6, a functional block diagram of a FOD system 600 with a circular loop is shown. The FOD system 600 includes a circular loop 602 operably coupled to a control circuit 606. The circular loop 602 is exemplary only and not a limitation as other loop orientations and loop configurations (e.g., double loop 504) may be used. While only one loop is shown, the circular loop 602 may be constructed using multiple loops of an insulated conductor (e.g., wire). For example, the circular loop 602 may include 10 turns of wire. The control circuit 606 may be a part of the foreign object detection module 380 (FIG. 3), and may include a detector 610, a transceiver 612, a filter 614, a processor unit 616 (possibly including multiple processors, multiple cores, multiple nodes, and/or implementing multi-threading, etc.), a memory unit 618, a network interface 622, and bus 620. While the control circuit 606 includes components configured for digital signal processing, analog signal processing components and techniques may also be used. The memory unit 618 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The control circuit 606 also includes a bus 620 (e.g., PCI, ISA, PCI-Express, HyperTransport®, InfiniBand®, NuBus, AHB, AXI, etc.), and network interface 622 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The transceiver 612 is configured to drive and detect changes in the electrical characteristics on the circular loop 602. In an example, the transceiver 612 is configured to drive and detect signals in the range of 1-10 MHz (e.g., at a different frequency than the wireless power transfer operating frequency). The filter 614 may be configured as a narrow bandpass filter to improve the signal-to-noise ratio of the received signal. The detector 610 may be an analog or digital signal processing system configured to detect changes in the electrical characteristics of the circular loop 602 such as a change in the induced voltage and/or a change in phase of the received signal. The presence of a foreign object 604, and the corresponding interaction with the magnetic flux, may cause variations in the magnitude and phase of the received signal as compared to a signal when no foreign object is present. The detector 610 is a means for detecting changes in the electrical characteristics of the circular loop 602. Any one of these functionalities may be partially (or entirely) implemented in hardware and/or on the processor unit 616. For example, the functionality may be implemented with an application specific integrated circuit, in logic implemented in the processor unit 616, in a co-processor on a peripheral device or card, etc. Further, realizations may include fewer or additional components not illustrated in FIG. 6 (e.g., video cards, audio cards, additional network interfaces, peripheral devices, etc.). The detector 610, transceiver 612, filter 614, processor unit 616, the memory unit 618, and the network interface 622 are coupled to the bus 620. Although illustrated as being coupled to the bus 620, the memory unit 618 may be coupled to the processor unit 616. The control circuit 606 may be configured to send a command to the foreign object detection module based on the changes to the electrical characteristics. For example, the control circuit 606 may send a command to halt, or otherwise reduce, a charging operation based on the detection of a foreign object (e.g., a change in the electrical characteristics).

Figure 7E:
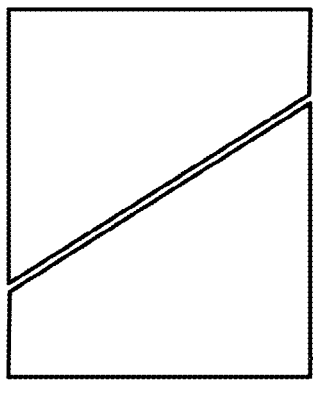
FIGS. 7A-7I are schematic diagrams of exemplary FOD loop configurations.
Figure 7F:
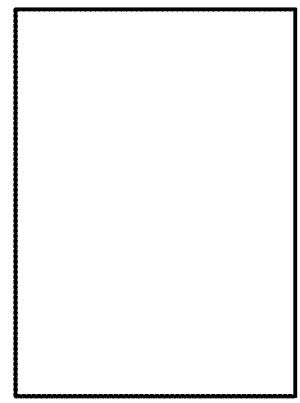
Figure 7C:
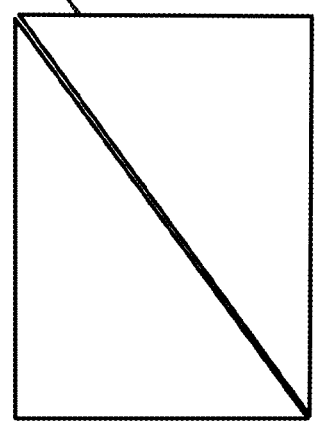
Figure 7D:
Figure 7A:
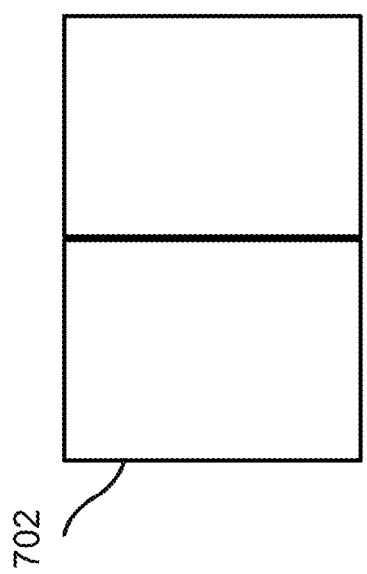
Figure 7B:
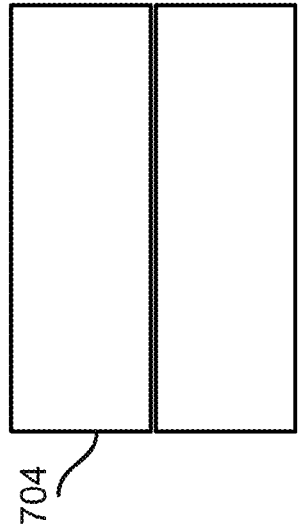
Figure 7I:
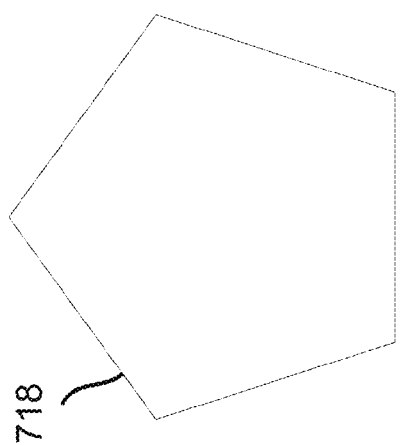
Figure 7H:
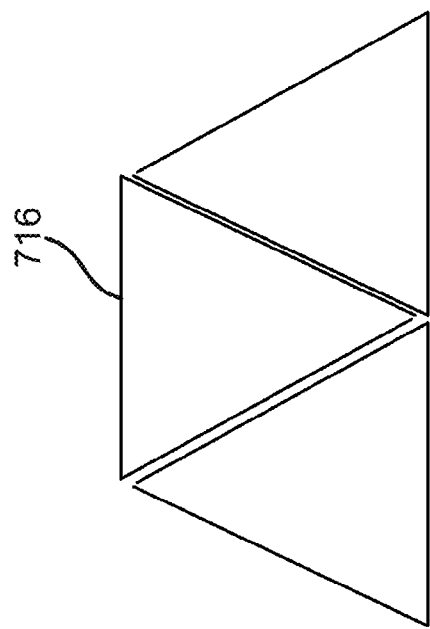
Figure 7G:
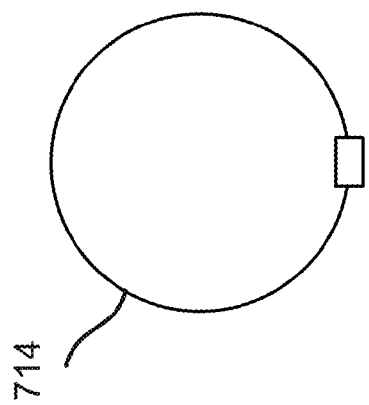

Referring to FIGS. 7A-7I, with further reference to FIGS. 5 and 6, schematic diagrams of exemplary FOD loop configurations are shown. Each of the FOD loop configurations in FIGS. 7A-7I are examples of a FOD loop configurations that may be used in one or more elements of a FOD loop array. The configurations and orientations of the FOD loop configurations are exemplary only and not a limitation as other configurations and orientations may be used to reduce the magnetic coupling between the FOD loop and a charging area (e.g., with one or more charging coils) at each element location. FIG. 7A illustrates a double loop 702 (e.g., DD loop) such as described in FIG. 5. In an example, the double loops described herein may be achieved via one or more figure-eight windings around an insulated frame. Other winding configurations may also be used. FIG. 7B illustrates another double loop 704 in a different orientation than the double loop 702 in FIG. 7A. Both double loops 702, 704 are designed to generate a horizontally aligned magnetic main flux, with the double loop 702 being further oriented along an x-axis and the double loop 704 being further oriented along a y-axis (y-axis oriented in 90 degrees compared to the corresponding x-axis). FIGS. 7C and 7D illustrate diagonally oriented double loops 706, 708 which are oriented along a diagonal axis between the x-axis and the y-axis. The dimensions and angle of the FOD loops are exemplary only and not a limitation as the angle may be increased or decreased to change the off-axis sensitivity. For example, referring to FIG. 7E, the double loop 710 illustrates an example of a diagonally oriented double loop with a different axis of symmetry. Each of the double loops 706, 708, 710 in FIGS. 7A-7E generates a horizontally aligned magnetic flux. FIG. 7F illustrates a circular loop 712 such as described in FIGS. 5 and 6. The circular loop 712 may also be further oriented in the x-y plane (e.g., rotated within the FOD array). The circular loop 712 is an example of a magnetic vertical flux direction. FIG. 7G illustrates and another example of a circular loop 714 (e.g., with a circular or oval circumference). FIGS. 7H and 7I illustrate examples of other polygon loops such as a triangle loop 716 and a pentagon loop 718. As an example, the length and width dimensions of the FOD loops may range between 40 mm×28 mm to 200 mm×150 mm. The dimensions may also vary based on other charging system dimensions (e.g., base pad size) and performance requirements (e.g., sensitivity). The rectangular shapes and orientations of the FOD loops in FIGS. 7A-7I are exemplary only, and not a limitation, as other orientations and geometric antenna shapes may be used (e.g., circular, circular-rectangle, oval, triangular, or other polygons).

Figure 8:
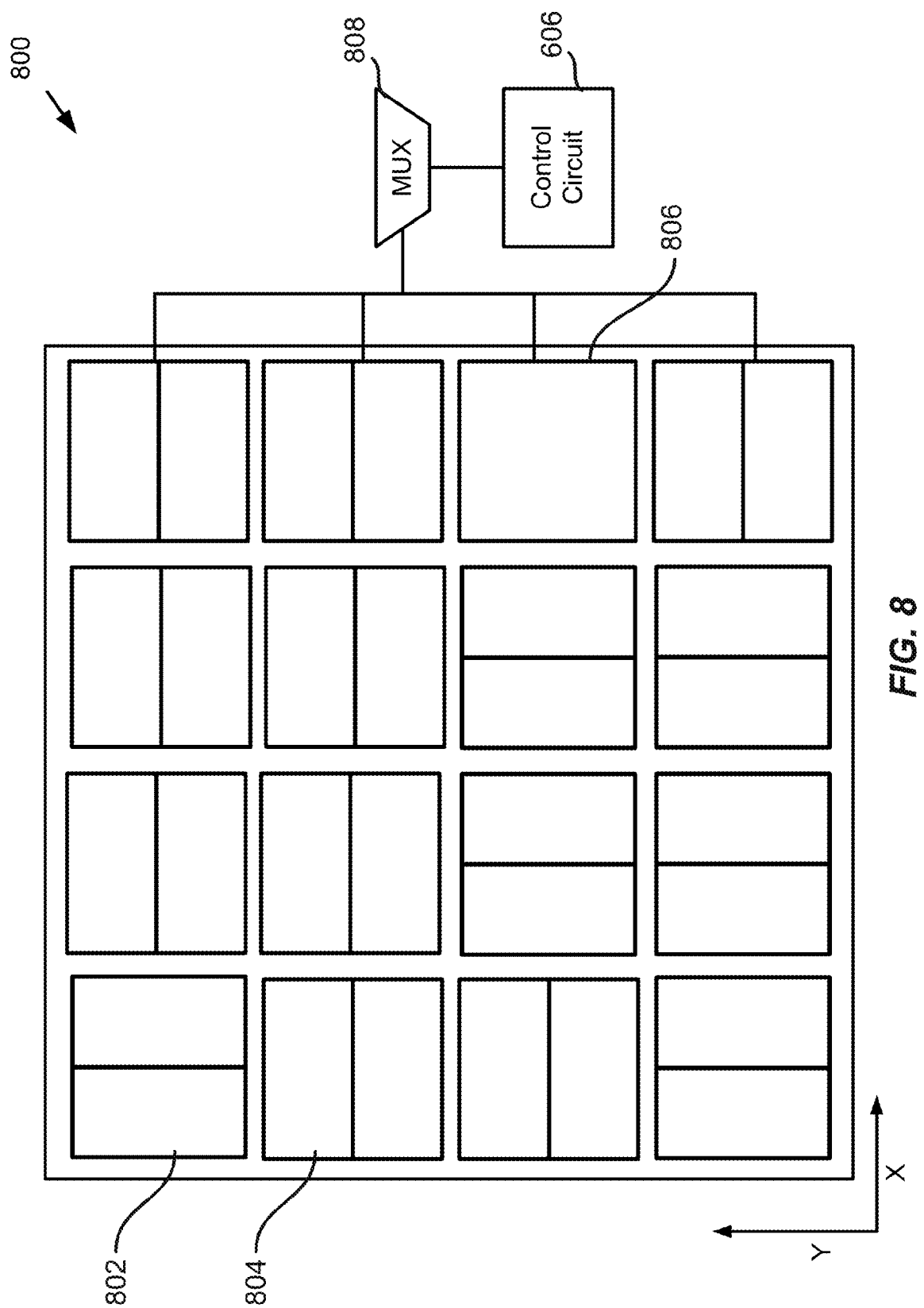
FIG. 8 is a schematic diagram of an exemplary hybrid FOD loop array.

Referring to FIG. 8, with further reference to FIGS. 6 and 7A-7I, a schematic diagram of an exemplary hybrid FOD loop array 800 is shown. As used herein, the term array means an ordered arrangement of FOD loop elements and is not limited to a specific geometric order or design. In an example, the hybrid FOD loop array 800 may include a variable number of individual FOD loops arranged as grid spaces in a column and row configuration. As an example, and not a limitation, the hybrid FOD loop array 800 includes 16 elements arranged in a 4 by 4 grid. Other array dimensions may be used. The configuration and orientation of each FOD loop in the array elements may vary based on the magnetic flux generated by the under laying charging coils. In an example, the hybrid FOD loop array 800 may include a combination of a first loop configuration and a second loop configuration different than the first loop configurations (e.g., in various orientations and polarizations). In an example, the hybrid FOD loop array 800 may include a combination of circular and double loop configurations in various orientations. As depicted in FIG. 8, the hybrid FOD loop array 800 may include a first array element 802 with a double loop with a first orientation (e.g., oriented along the x-axis), and a second array element 804 with a double loop in a second orientation (e.g., oriented along the y-axis). A third element 806 may include a circular FOD loop oriented along the x or the y axis. In general, a difference between the first and second loop configurations corresponds to a difference in a direction or orientation of a magnetic flux direction of the respective FOD loops within the FOD loop array. Each of the FOD loop elements may be defined in two dimensions (e.g., lengths along the x-axis and y-axis) and may define a size of a coverage area. The coverage areas of each of the FOD loop elements may be equal or may vary based magnetic flux patterns or other design criteria. In an example, one or more elements of the hybrid FOD loop array 800 may be combined such that the combined element space includes a single FOD loop (e.g., a relatively larger coverage area with a single larger FOD loop). Other examples of the hybrid FOD loop array 800 may include FOD loops of different geometric shapes such as an array including circular FOD loops, triangular FOD loops, off-axis double loops, and hexagonal FOD loops.

In operation, the control circuit 606 may include a multiplexer 808 configured to couple the transceiver 612 to each of the FOD loops in the hybrid FOD loop array 800. The multiplexer 808 may be configured for concurrent detection of more than one of the FOD loops. In an example, the multiplexer 808 may be configured to enable detection with one or more FOD loops periodically, or in a sequence (e.g., a FOD loop every 10 ms, 20 ms, 100 ms, 500 ms, etc. . . . ).

Figure 9:
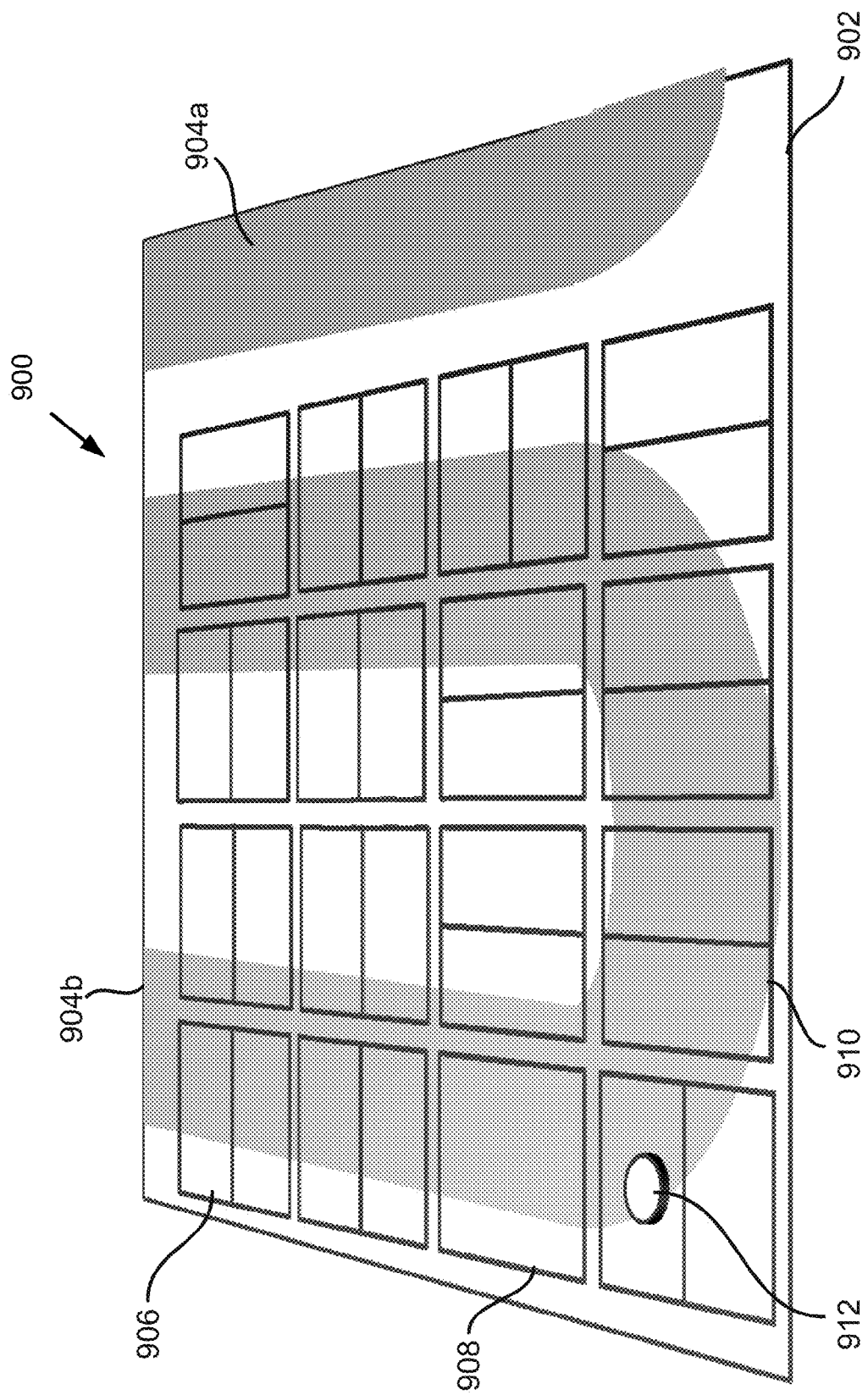
FIG. 9 is a diagram of a hybrid FOD loop array over a portion of a base pad.

Referring to FIG. 9, with further reference to FIGS. 3 and 8, a diagram of a hybrid FOD loop array 900 over a portion of a base pad 902 is shown. The portion of the base pad 902 includes a first conductor 904a and a second conductor 904b configured to inductively transfer power (e.g., via magnetic flux) to an electric vehicle, or other device configured for wireless power transfer. The portion of the base pad 902 is an example of a charging area. The first conductor 904a and a second conductor 904b may produce magnetic flux in different direction (e.g., a first direction may be vertical flux and a second direction may be horizontal flux). The hybrid FOD loop array 900 may include one or more FOD loops disposed over the base pad. For example, the hybrid FOD loop array 900 may include a first element 906 with a double loop in a first orientation, a second element 908 with a circular loop, and a third element 910 with a double loop in a second orientation. Other elements in the hybrid FOD loop array 900 may include FOD loops with similar or different configurations and/or orientations. The configuration and orientation of the FOD loops in each element are selected to reduce the magnetic coupling with the base pad conductors. In an example, each practical FOD loop configuration and orientation in an element may be analyzed with a finite element algorithm (e.g., ANSYS Maxwell) based on the operating frequency, and the configuration and orientation of with the lowest magnetic coupling value may be selected. In this way, the induced voltage in the FOD loops resulting from the primary charging field may be reduced so that filtering out the influence of such induced voltage is easier or otherwise the field has less impact on the signals analyzed as a result of the FOD field. The portion of the base pad 902 may represent part of a modular base pad design such that multiple version of the base pad 902 may be assembled to for a larger charging area. The FOD loop array 900 may be integrated with the portion of the base pad 902 and may be operably coupled to a controller (e.g., a foreign object detection module 380). In operation, a foreign object 912 such as a coin, washer, nut, bolt, or other metallic object, may be located on the base pad. During operation, the base charging system controller 342 may receive an indication from the foreign object detection module 380 that a foreign object has been detected by one or more of the FOD loops in the hybrid FOD loop array 900. The base charging system controller 342 may be configured to notify a user via the base charging system communication interface that the foreign object has been detected. In an example, the user notification may include a relative position of the foreign object based on the location of the detecting FOD loop(s). The base charging system controller 342 may also be configured to secure charging operations when a foreign object is detected.

Figure 10:
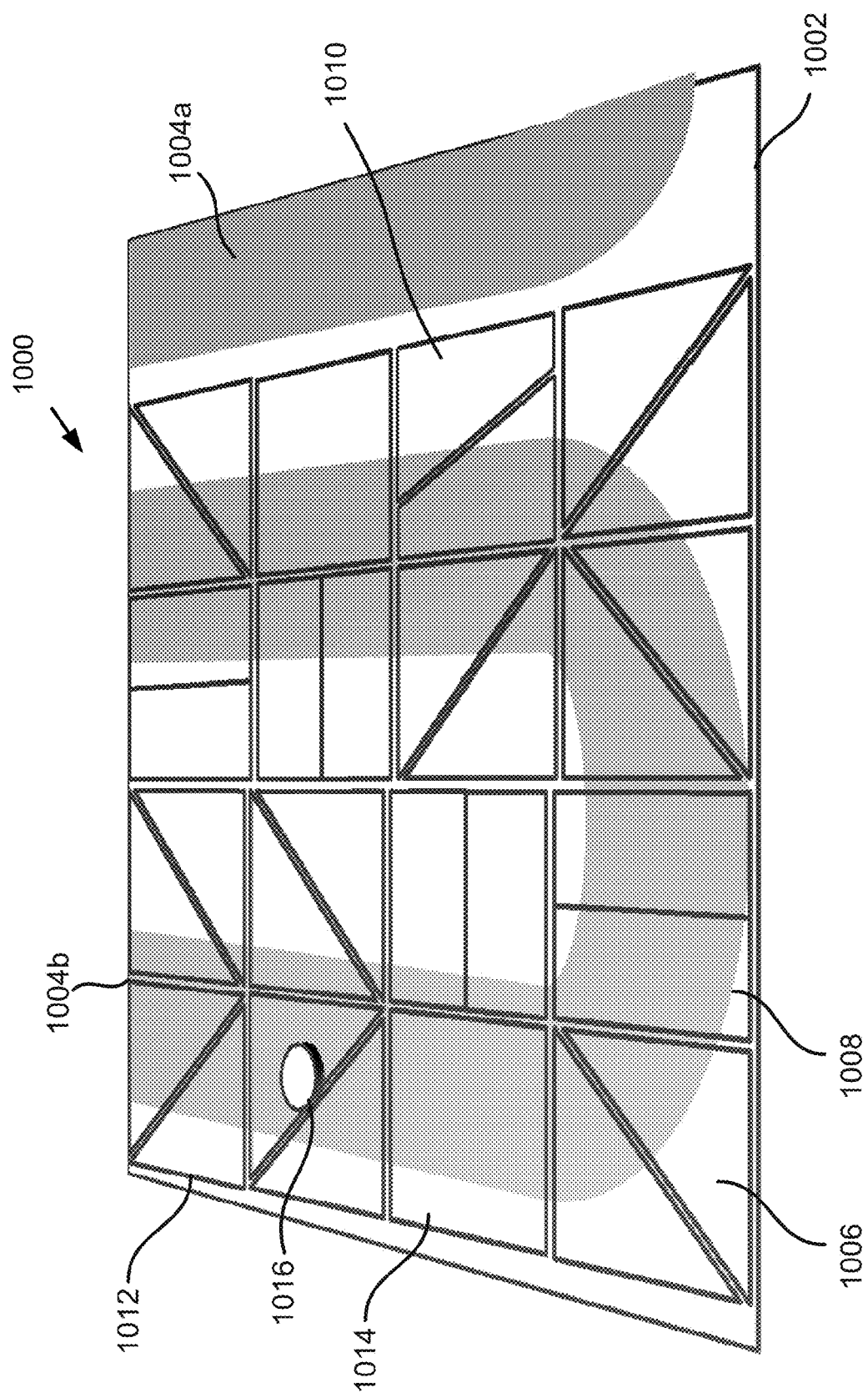
FIG. 10 is a diagram of another hybrid FOD loop array over a portion of a base pad.

Referring to FIG. 10, with further reference to FIGS. 3 and 8, a diagram of another hybrid FOD loop 1000 over a portion of a base pad 1002. The portion of the base pad 1002 includes a first conductor 1004a and a second conductor 1004b configured to inductively transfer power (e.g., via magnetic flux) to an electric vehicle, or other device configured for wireless power transfer. The hybrid FOD loop array 1000 illustrates additional examples of FOD loop configurations and orientations which may be used to reduce the magnetic coupling between the individual FOD loops and the base pad conductors. In general, the magnetic coupling is based on the interaction at the operating frequency of the base pad 1002. The reduction in the magnetic coupling value for each FOD loop may increase the signal-to-noise ratio for the respective loops and increase the sensitivity for detecting foreign objects (e.g., such as the foreign object 1016). For example, the hybrid FOD loop array 1000 may include a first element 1006 with a diagonal double loop in a first orientation, a second element 1008 with a double loop in a second orientation, a third element 1010 with an off-axis double loop in a third orientation, a fourth element with a diagonal double loop in a fourth orientation, and a fifth element 1014 with circular loop. As depicted in FIG. 10, other elements in the hybrid FOD loop array 1000 may include FOD loops with similar or different configurations and/or orientations.

Figure 11A:
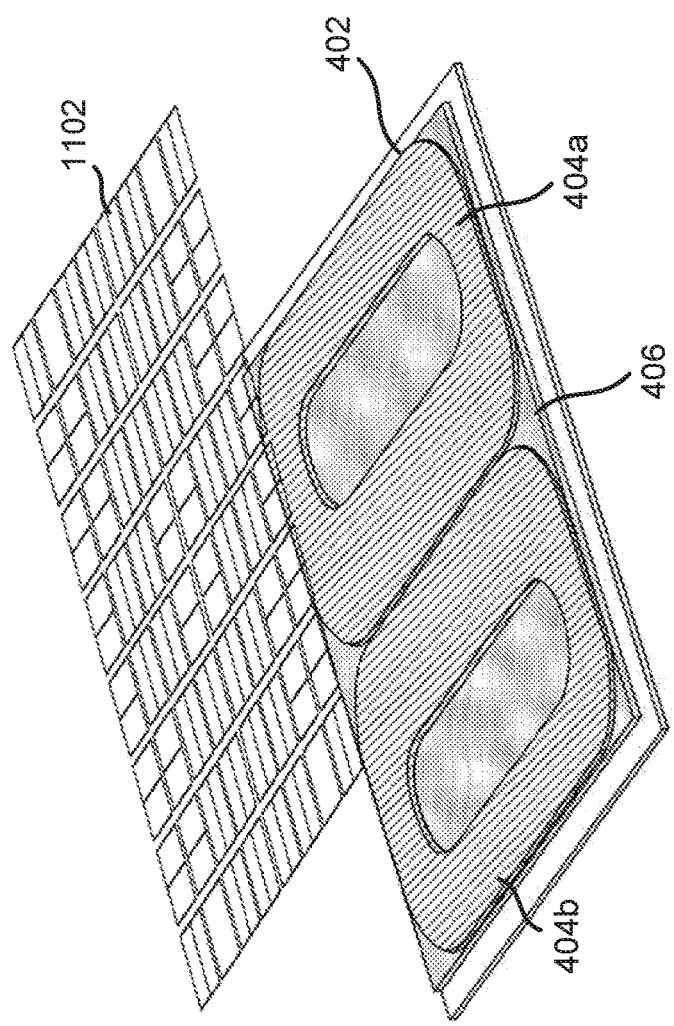
FIGS. 11A and 11B are expanded diagrams of a hybrid FOD loop array over a base pad.
Figure 11B:
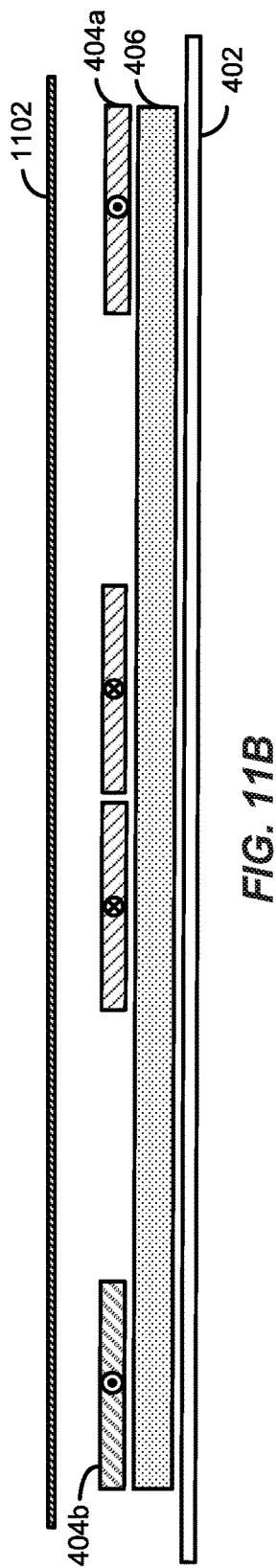
Figure 12:
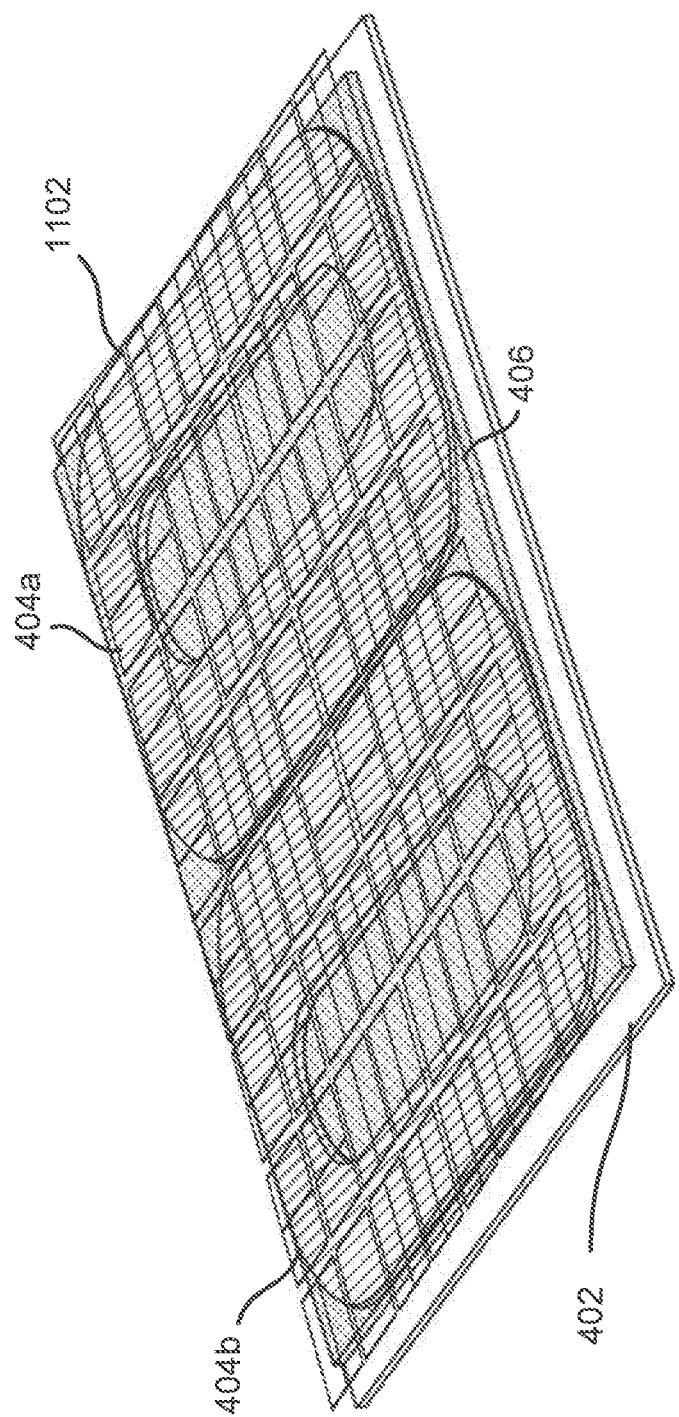
FIG. 12 is a collapsed diagram of the hybrid FOD loop array and base pad of FIGS. 11A and 11B.

Referring to FIGS. 11A and 11B, with further reference to FIGS. 3, 4 and 8, an expanded perspective diagram and a side-view diagram of a hybrid FOD loop array 1102 and a magnetic flux device 402 are shown. In an example, the hybrid FOD loop array 1102 may include 64 elements in an 8×8 matrix. The magnetic flux device 402 is a base pad for charging an electric vehicle and the hybrid FOD loop array 1102 is located over the charging area. In this configuration, the magnetic flux device 402 may be installed at ground level and configured to provide an inductive power transfer to up to a vehicle base pad. Since a base pad that is installed in the ground is susceptible to foreign objects falling to the ground, the hybrid FOD loop array 1102 is disposed on top of the base pad in an intervening location between the base pad and a potential foreign object. FIG. 12 depicts the hybrid FOD loop array 1102 in a proximate location to the magnetic flux device 402. The dimensions and distances depicted in FIGS. 11A and 11B are provided for illustrative purposes and are not to scale. The first electrically conductive coil 404a and the second electrically conductive coil 404b are electrically isolated from the hybrid FOD loop array 1102. That is, conductors in the first electrically conductive coil 404a and the second electrically conductive coil 404b are insulated from the receiver loops in the hybrid FOD loop array 1102. In an example, the hybrid FOD loop array 1102 and the magnetic flux device 402 may be encapsulated within a single exterior casing (not shown) and installed as a single unit. The hybrid FOD loop array 1102 may be the hybrid FOD loop array 382 and may be operably coupled to a foreign object detection module 380 in the wireless charging system 302.

Figure 13:
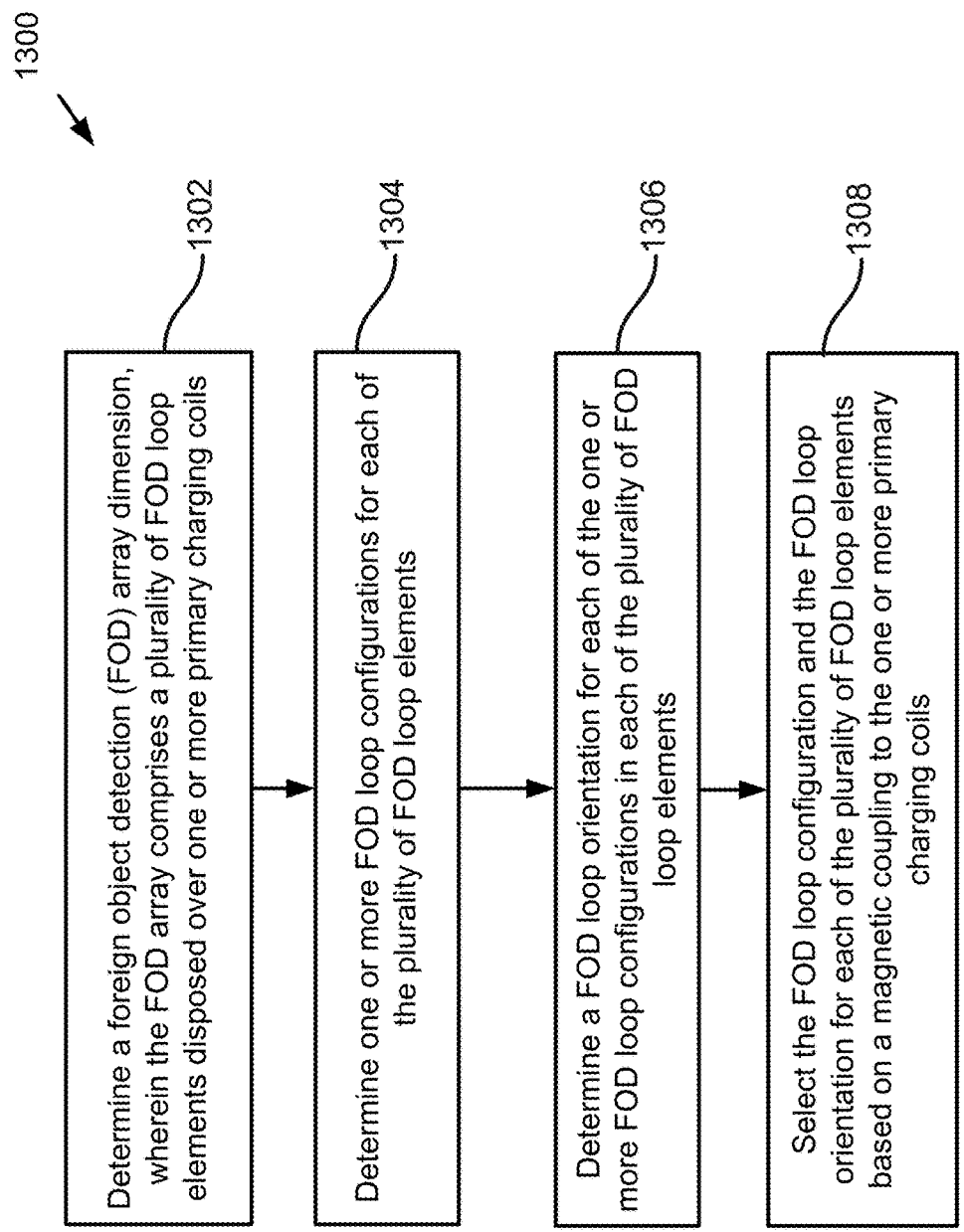
FIG. 13 is a process diagram for selecting FOD loop configurations and FOD loop orientations in a FOD loop array.

Referring to FIG. 13, with further reference to FIGS. 3, 6 and 7A-7D, a process 1300 for selecting FOD loop configurations and FOD loop orientations in a FOD loop array includes the stages shown. The process 1300, however, is exemplary only and not limiting. The process 1300 may be altered, e.g., by having stages added, removed, or rearranged.

At stage 1302, the dimensions of a charging area, such as a magnetic flux device 402, may be the basis for determining the dimensions of a foreign object detection (FOD) array. Other factors such as the charging application, desired sensitivity, and manufacturability may influence the dimensions of the FOD array. The magnetic flux device 402 may include one or more primary charging coils and the FOD array may comprise a plurality of FOD loop elements loop disposed over one or more of the primary charging coils. For example, referring to FIG. 12, the magnetic flux device 402 is a base pad for charging an electric vehicle and the hybrid FOD loop array 1102 is located over the charging area. As an example, the hybrid FOD loop array 1102 includes 64 FOD loop elements in an 8×8 matrix. Each of the FOD loop elements includes one FOD loop such as the examples described in FIGS. 7A-7I. Other array sizes (e.g., number of elements) and arrangements may also be used.

At stage 1304, one or more FOD loop configurations may be determined for each of the plurality of FOD loop elements. Example FOD loop configurations are depicted in FIGS. 7A-7I and include various arrangements of circular and double-D windings. At stage 1306, the orientation of each of the FOD loop configurations in each of the plurality of elements may be determined. For example, as depicted in FIGS. 7A-7I, each of the FOD loop configurations can be configured in different orthogonal and diagonal orientations. The FOD loop configurations and orientation in FIGS. 7A-7I are exemplary only, and not a limitation, as other orientations and geometric antenna shapes may be used (e.g., circular, circular-rectangle, oval, triangular, or other polygons).

At stage 1308, a FOD loop configuration and a FOD loop orientation for each of the plurality of FOD loop elements may be selected based on a magnetic coupling value to the one or more primary charging coils. In an example, a finite element method may be used to determine the magnetic coupling for each iteration of the possible loop configuration and orientation combinations in each element. The loop configuration and orientation with the relatively lowest magnetic coupling (i.e., a minimum magnetic coupling) in each element may be selected. This iterative analysis may be performed for each element in the FOD array and may result with different loop configurations and orientations in neighboring elements. Thus, one or more elements in the FOD array may generate a magnetic flux in a horizontal plane while one or more other elements may generate a magnetic flux in a vertical plane. The various loop configurations and orientations enable a relative minimum magnetic coupling in the area of the array element with the overall impact of reducing the amount of noise detected by the entire array.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for detecting a presence of a metallic or a ferromagnetic object over a region for wirelessly transferring power to charge an electric vehicle, the apparatus comprising:
a plurality of foreign object detection (FOD) loops arranged in an array over a charging area, at least a portion of the plurality of FOD loops being in a first configuration and at least a portion of the plurality of FOD loops being in a second configuration different than the first configuration based on a value indicative of an amount of magnetic coupling between one or more charging coils in the charging area and a respective one the plurality of FOD loops within a corresponding area of the array, wherein a difference between the first configuration and the second configuration corresponds to a difference in a magnetic flux direction of the respective portions of FOD loops.

2. The apparatus of claim 1 wherein the amount of magnetic coupling is based on an operating frequency of the one or more charging coils in the charging area.

3. The apparatus of claim 1 wherein the charging area includes one or more areas with a first magnetic flux direction and one or more areas with a second magnetic flux direction different from the first magnetic flux direction.

4. The apparatus of claim 3 wherein the at least a portion of the plurality of FOD loops being in the first configuration are disposed over the one or more areas with the first magnetic flux direction, and the at least a portion of the plurality of FOD loops being in the second configuration are disposed over the one or more areas with the second magnetic flux direction.

5. The apparatus of claim 1 wherein the first configuration is a circular loop and the second configuration is a double loop.

6. The apparatus of claim 5 wherein the double loop is wound with a figure-eight configuration.

7. The apparatus of claim 5 wherein the second configuration is a double loop orientated along an x-axis or a double loop oriented along a y-axis.

8. The apparatus of claim 5 wherein the second configuration is a double loop oriented along a diagonal axis oriented between an x-axis and a y-axis.

9. The apparatus of claim 1 further comprising a control circuit operably coupled to each of the plurality of FOD loops and configured to drive each of the plurality of FOD loops at a first frequency that is different from an operating frequency of the one or more charging coils in the charging area to generate a magnetic field, and to detect the metallic or the ferromagnetic object based on an electrical characteristic in one or more of the plurality of FOD loops caused by the metallic or the ferromagnetic object coupling with the magnetic field.

10. The apparatus of claim 9 wherein the electrical characteristic is a voltage amplitude value.

11. The apparatus of claim 9 wherein the electrical characteristic is a phase measurement.

12. The apparatus of claim 9 wherein the control circuit is configured to reduce a charging operation based on the electrical characteristic in one or more of the plurality of FOD loops.

13. A method of detecting foreign objects in a wireless power transfer system, comprising:
  determining a foreign object detection (FOD) array dimension, wherein the FOD array comprises a plurality of FOD loop elements disposed over one or more primary charging coils in the wireless power transfer system;
  determining one or more FOD loop configurations for each of the plurality of FOD loop elements, wherein the one or more FOD loop configurations include a circular loop and a double loop;
  determining a FOD loop orientation for each of the one or more FOD loop configurations in each of the plurality of FOD loop elements; and
  selecting a FOD loop configurations and the FOD loop orientation for each of the plurality of FOD loop elements based on a magnetic coupling to the one or more primary charging coils.

14. An apparatus for wirelessly transferring power to charge an electric vehicle, comprising:
  a primary charging coil in a double-D (DD) configuration configured to operate at a first frequency;
  a plurality of foreign object detection (FOD) loops arranged in an array over the primary charging coil, at least a portion of the plurality of FOD loops being in a first configuration and at least a portion of the plurality of FOD loops being a second configuration that is different than the first configuration, wherein a difference between the first configuration and the second configuration corresponds to a magnetic flux direction of the respective at least a portion of the plurality of FOD loops; and
  a control circuit operably coupled to the primary charging coil and the plurality of FOD loops, and configured to drive the plurality of FOD loops at a second frequency that is different from the first frequency to generate a magnetic field, and to detect a foreign object based on an electrical characteristic in at least one of the plurality of FOD loops caused by the foreign object coupling with the magnetic field.

15. The apparatus of claim 14 wherein the first configuration is a circular loop and the second configuration is a double loop.

16. The apparatus of claim 14 wherein the primary charging coil includes one or more areas with a first magnetic flux direction and one or more areas with a second magnetic flux direction different from the first magnetic flux direction.

17. The apparatus of claim 16 wherein the at least a portion of the plurality of FOD loops being in the first configuration are disposed over the one or more areas with the first magnetic flux direction, and the at least a portion of the plurality of FOD loops being in the second configuration are disposed over the one or more areas with the second magnetic flux direction.

18. The apparatus of claim 14 wherein the second configuration is a double loop oriented along a diagonal axis oriented between an x-axis and a y-axis.

19. The apparatus of claim 14 wherein the electrical characteristic is at least one of a voltage amplitude value or a phase measurement.

20. The apparatus of claim 14 wherein the control circuit is configured to reduce a transfer of power to the electric vehicle based on the electrical characteristic in one or more of the plurality of FOD loops.

21. The apparatus of claim 14 wherein the first frequency is in a range from 80-90 kHz.

22. The apparatus of claim 14 wherein the second frequency is in a range from 1-10 MHz.

23. An apparatus for wirelessly transferring power to charge an electric vehicle, comprising:
  a primary charging means for providing power to the electric vehicle at a first frequency;
  detection means for detecting foreign objects, the detection means arranged in an array over the primary charging means, at least a portion of the detection means being in a first configuration and at least a portion of the detection means being a second configuration that is different than the first configuration, wherein a difference between the first configuration and the second configuration corresponds to a magnetic flux direction of the respective at least a portion of the detection means; and
  a control means operably coupled to the detection means and configured to drive the detection means at a second frequency that is different from the first frequency to generate a magnetic field, and to detect a foreign object based on an electrical characteristic in the detection means caused by the foreign object coupling with the magnetic field.

24. The apparatus of claim 23 wherein the control means is operably coupled to the primary charging means and configured to reduce a transfer of power to the electric vehicle based on the electrical characteristic in the detection means.

* * * * *